(12) United States Patent
Hauser et al.

(10) Patent No.: US 6,994,180 B1
(45) Date of Patent: Feb. 7, 2006

(54) UTILITY VEHICLE HAVING HYDROSTATIC DRIVE

(75) Inventors: Raymond Hauser, Sullivan, IL (US);
Ronald Sporrer, Easley, SC (US);
Frederic W. Pollman, Eden Prairie, MN (US)

(73) Assignee: Hydro-Gear Limited Partnership, Sulllivan, IL (US)

( * ) Notice: Subject to any disclaimer, the term of this patent is extended or adjusted under 35 U.S.C. 154(b) by 0 days.

(21) Appl. No.: 10/965,635

(22) Filed: Oct. 14, 2004

Related U.S. Application Data

(62) Division of application No. 10/314,814, filed on Dec. 9, 2002, now Pat. No. 6,860,358.

(60) Provisional application No. 60/416,027, filed on Oct. 4, 2002.

(51) Int. Cl.
*B60K 17/00* (2006.01)

(52) U.S. Cl. .................. 180/305; 180/307; 180/53.4

(58) Field of Classification Search .............. 180/235, 180/242, 306, 307, 308, 248, 249, 305, 53.1, 180/53.2, 53.4; 280/504, 515, 856; 74/15.66, 74/15.6, 15.8
See application file for complete search history.

(56) References Cited

U.S. PATENT DOCUMENTS

| | | | |
|---|---|---|---|
| 3,779,608 A * | 12/1973 | Hatcher et al. ............ 180/53.2 |
| 4,155,415 A * | 5/1979 | van der Lely .............. 180/235 |
| 4,882,940 A * | 11/1989 | Yamaoka et al. .......... 74/15.66 |
| 4,947,956 A * | 8/1990 | Henline ...................... 180/235 |
| 5,381,987 A | 1/1995 | Carns |
| 5,467,597 A | 11/1995 | Forster |
| 5,575,737 A | 11/1996 | Weiss |
| 5,823,284 A | 10/1998 | Hoar et al. |
| 5,957,235 A * | 9/1999 | Nishimura et al. ......... 180/306 |
| 6,015,019 A * | 1/2000 | Grimes et al. ............. 180/53.2 |
| 6,241,037 B1 * | 6/2001 | Karlsson ..................... 180/248 |
| 6,298,939 B1 | 10/2001 | Heindl et al. |
| 6,305,486 B1 | 10/2001 | Polsin et al. |
| 6,321,867 B1 * | 11/2001 | Kowalyk ..................... 180/307 |
| 6,363,815 B1 | 4/2002 | Ishimaru et al. |
| 6,729,830 B2 * | 5/2004 | Wagner et al. .............. 414/686 |
| 6,848,530 B2 | 2/2005 | Tani |
| 6,852,064 B2 | 2/2005 | Carlson et al. |
| 6,904,997 B2 | 6/2005 | Pollman |

* cited by examiner

*Primary Examiner*—Hau Phan
(74) *Attorney, Agent, or Firm*—Neal, Gerber & Eisenberg LLP

(57) ABSTRACT

A utility vehicle is disclosed within. The utility vehicle comprises a front axle, a pair of rear axle shafts, a seat for at least two occupants positioned between the front axle and the rear axle shafts, a load bed positioned over the rear axle shafts, a prime mover with a prime mover output shaft with a pulley attached to the end of the prime mover output shaft. Further, the vehicle has a hydraulic drive system that has a hydraulic pump driven by a pump input shaft, a hydraulic motor located within a common housing with the hydraulic pump, and gears and a differential located in the common housing with the hydraulic pump and the hydraulic motor. The prime mover output shaft and the pump input shaft are parallel to the front axle and the rear axle shafts.

17 Claims, 14 Drawing Sheets

UTILITY VEHICLE HAVING HYDROSTATIC DRIVE

This application is a divisional of U.S. patent application Ser. No. 10/314,814, filed on Dec. 9, 2002, now U.S. Pat. No. 6,860,358 which claims the benefit of U.S. Provisional Patent Application Ser. No. 60/416,027, filed on Oct. 4, 2002, both of which are incorporated herein by reference in their entirety.

BACKGROUND OF THE INVENTION

This invention relates to hydrostatic transmissions (HSTs) and integrated hydrostatic transaxles (IHTs) where the HST is in a common housing with output gearing, a differential, output axles and the like. The general design of an IHT is known, and is disclosed in U.S. Pat. Nos. 5,314,387 and 6,185,936, the terms of which are incorporated herein in their entirety. Such IHTs are generally used with lawn and garden tractors and similar low speed vehicles.

Hydrostatic technology has also been used in higher speed vehicles such as utility vehicles, but such vehicles generally use a system having a plurality of hydrostatic pumps connected to a plurality of wheel motors each driving an independent wheel. Furthermore, while such pumps and wheel motors have been used, the most typical method of propulsion in such utility vehicles uses a variable sheave to change the speed into the transmission. The former system is disadvantageous because of the complex valves and controls involved in controlling flow to the wheel motors. The latter system suffers from inconsistent transmission of torque, high maintenance costs, and lower performance under some wet conditions.

SUMMARY OF THE INVENTION

In order to overcome the disadvantages listed above, it is an object of this invention to use a hydrostatic transmission or integrated hydrostatic transaxle driving a pair of rear axles of a utility vehicle, where the HST or IHT is located under the utility bed of the vehicle, and the vehicle has a mid-mounted engine located between the front and rear axles of the vehicle.

In one embodiment, a BDU style hydrostatic transmission is mounted to a gearbox to form a unitary transmission, which is then secured to the rear axle of the utility vehicle. Such a transmission has a pump and motor mounted in parallel in a common housing. In yet another embodiment, a hydraulic pump drives a hydraulic motor which then drives a gear reduction in a utility vehicle. Additional embodiments are described in detail herein.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE DRAWINGS

Figure 1:
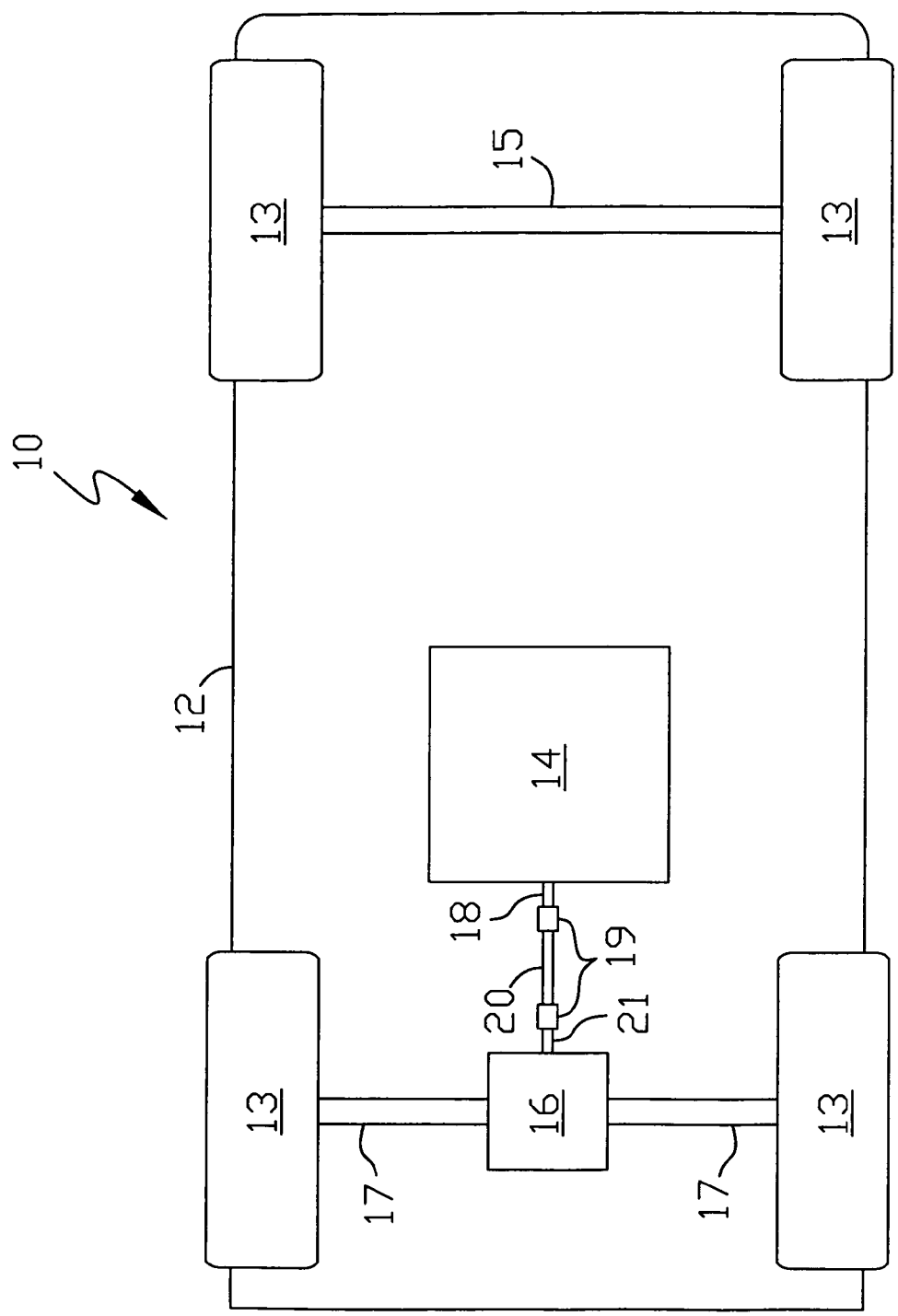
FIG. 1 is a bottom schematic plan view of a vehicle incorporating a first embodiment of this invention.

A first embodiment of this invention is shown schematically in FIG. 1, where vehicle 10 has a frame 12 and a front axle 15, rear axles 17 and engine 14 mounted thereon. It is intended that vehicle 10 be a utility vehicle with a working bed 48, as shown, for example, in FIGS. 4 and 6; the manner in which such elements as axles 15 and 17 or engine 14 are secured to frame 12 are not critical to the invention and will be known to one of skill in the art. A plurality of vehicle wheels 13 are secured at the ends of axles 15 and 17. A variety of different embodiments are disclosed herein. As shown most clearly in, e.g., FIGS. 6 and 14, it is intended that the vehicle 50 or 90 have a seat 39 with space for at least two people to ride side-by-side thereon and a working bed 48 or similar structure extending to the rear of the vehicle and over the rear axles 37 or 89. The benefits of this arrangement are an improved relationship of the engine with respect to the transaxle, and in particular with regard to the flexibility of the application. The arrangement taught herein gives the user the ability to select various input locations to correspond to the output locations of different engine configurations.

An integrated hydrostatic transaxle (IHT) 16 is also secured to frame 12 in a known manner and has an input shaft 21 extending out therefrom; in the embodiment shown in FIG. 1, input shaft 21 is coaxial with engine drive shaft 18 and is coupled via connecting shaft 20 and couplers 19.

Figure 2:
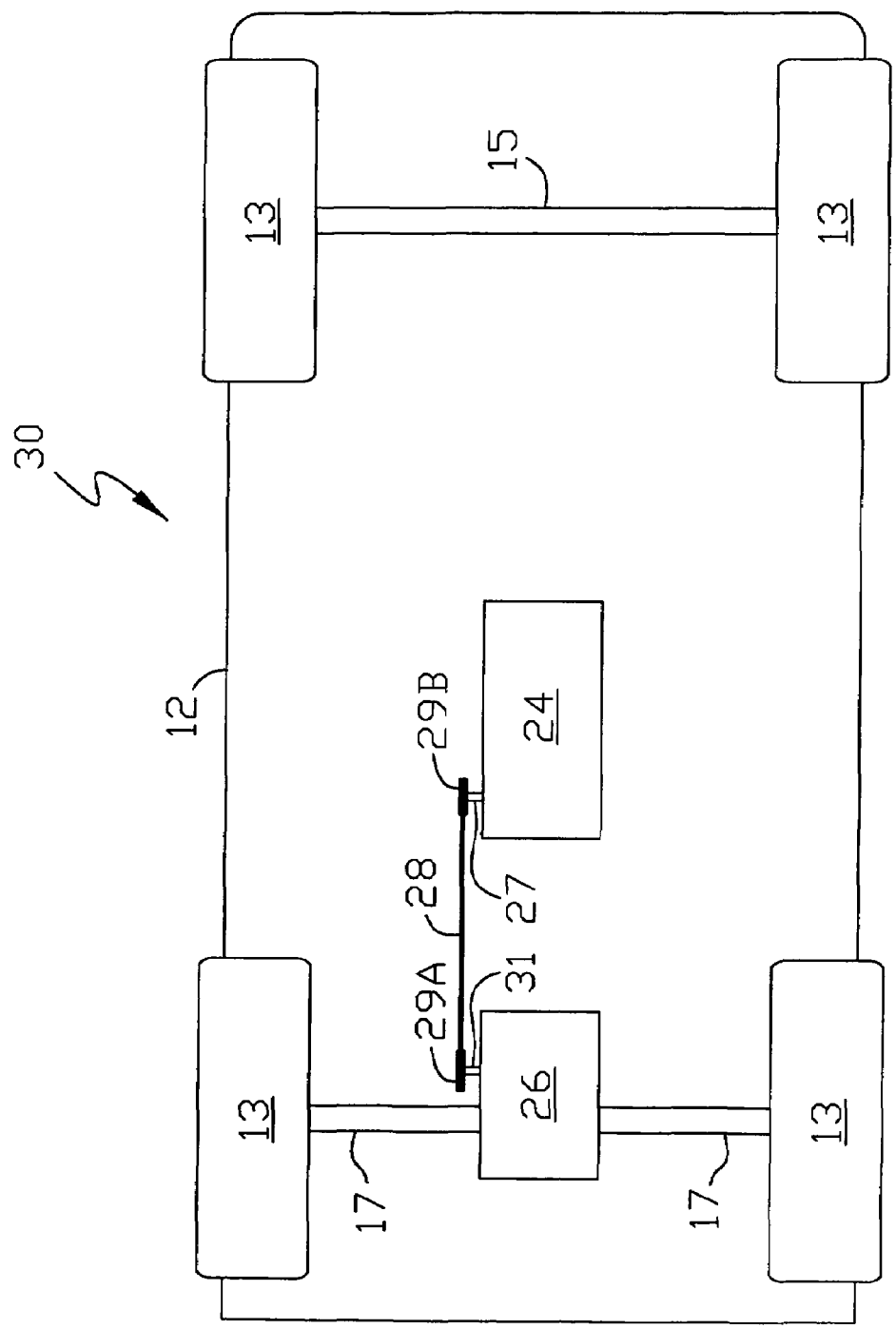
FIG. 2 is a bottom schematic plan view of a vehicle incorporating a second embodiment of this invention.

FIG. 2 shows another embodiment of the invention. In the alternative embodiment disclosed herein, like numerals represent structure identical or substantially identical to that described before. In this view, vehicle 30 has engine 24 with a drive shaft 27 extending out one side thereof and parallel to axles 15 and 17. Engine drive shaft 27, which may also be referred to as an output shaft, is engaged via pulley 29B and belt 28 to pulley 29A and input shaft 31 which drives IHT 26.

The IHTs 16 and 26 may have a pump and motor parallel to one another, such as in U.S. Pat. No. 5,392,670, or these units may be at right angles to one another such as in Pat. No. 5,314,387. Input shafts 21 and 31 may be directly coupled to the hydraulic pump (not shown) or it may be coupled to a separate pump input shaft through a bevel gear or similar arrangement.

Figure 3:
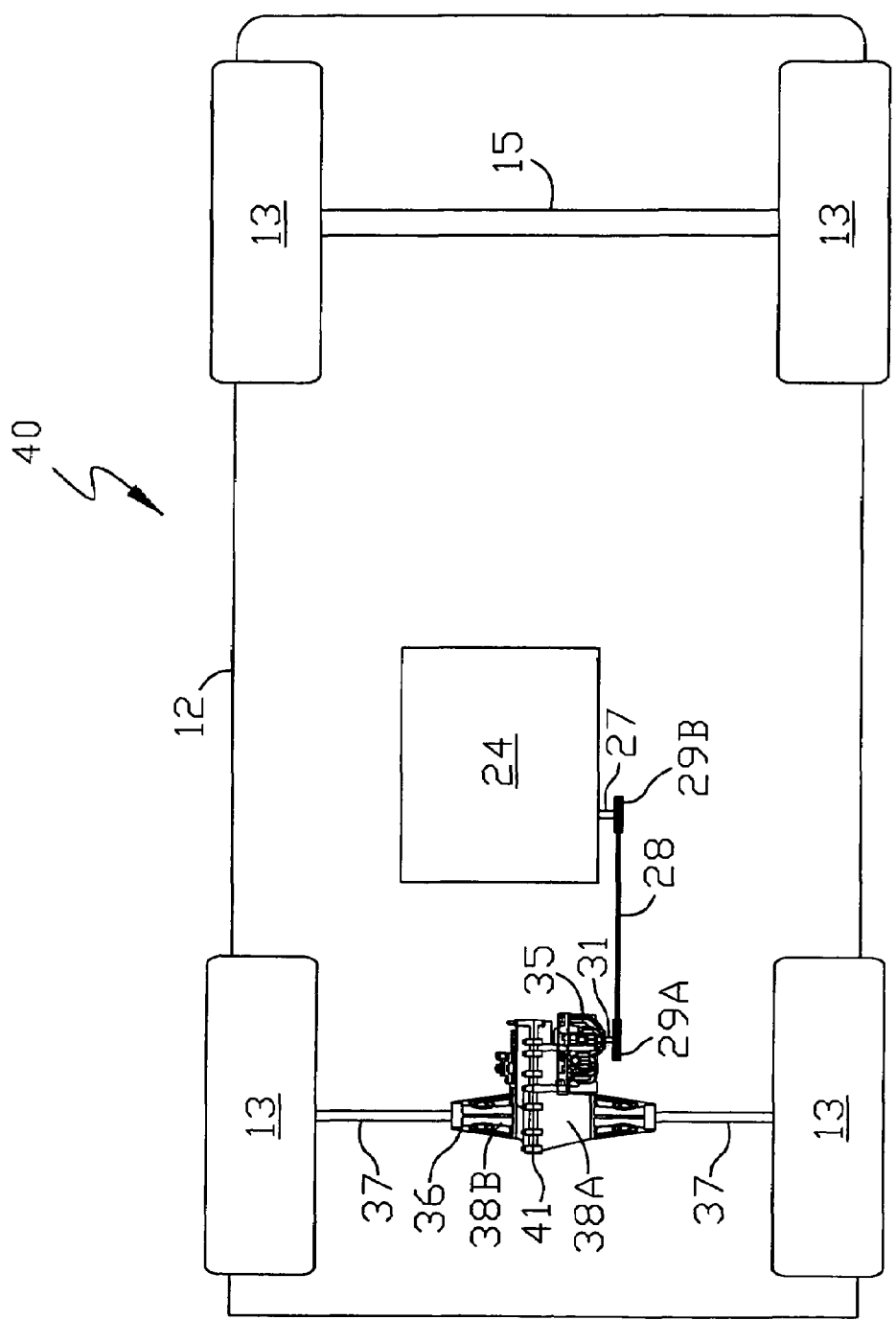
FIG. 3 is a bottom, partially-schematic plan view of a vehicle incorporating another embodiment of this invention.
Figure 4:
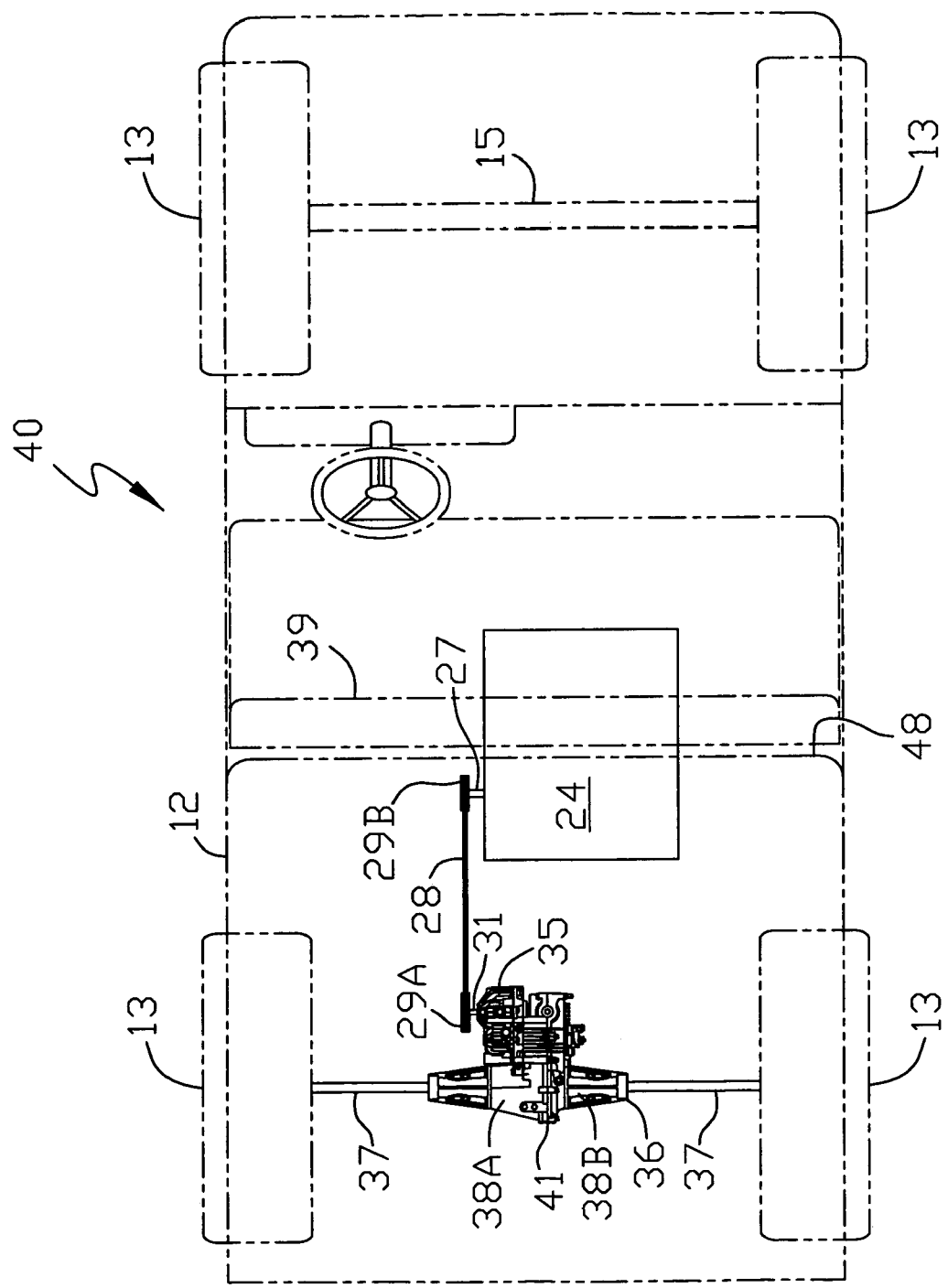
FIG. 4 is a top, partially-schematic plan view of the vehicle shown in FIG. 3, with certain components shown in outline for clarity.
Figure 5:
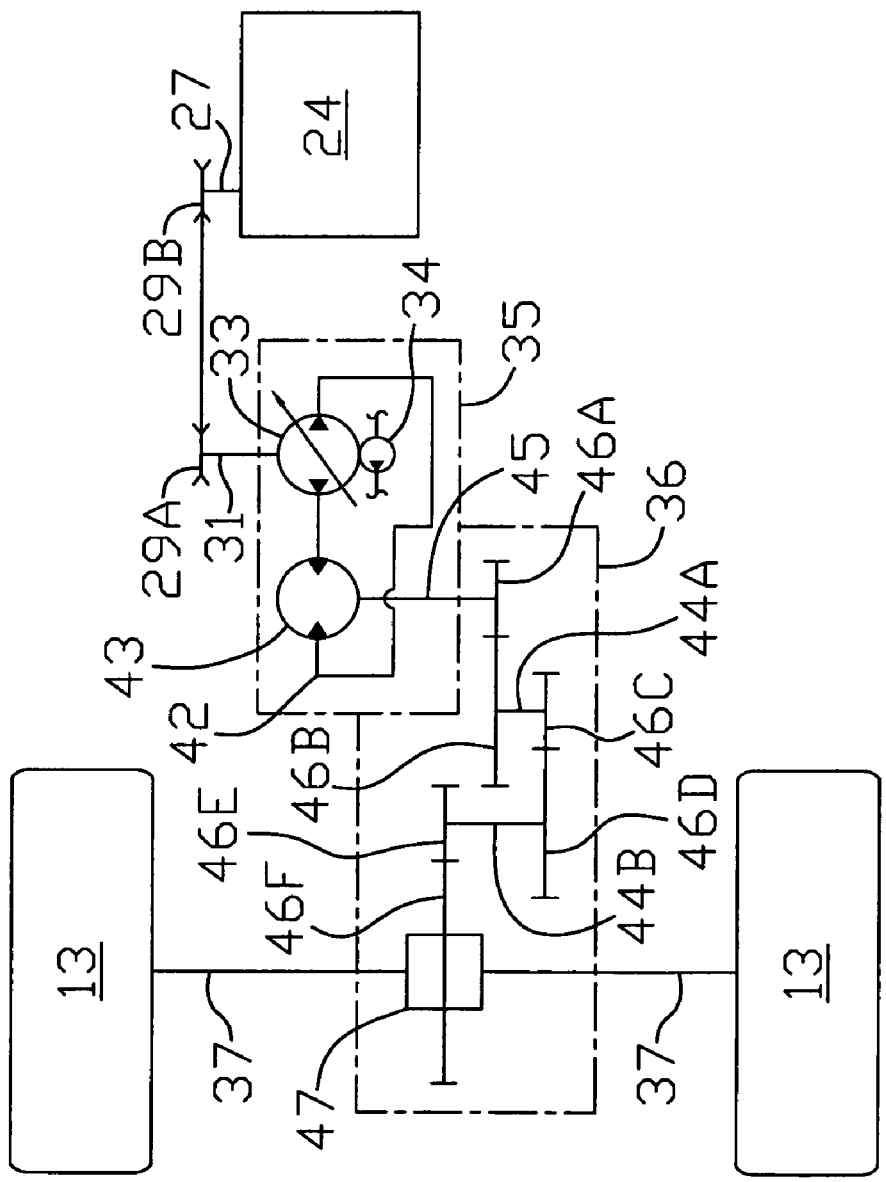
FIG. 5 is a schematic plan view of the transmission and other drive components of the vehicle shown in FIG. 3.

In the alternative embodiment depicted in FIGS. 3–5, vehicle 40 has engine 24 mounted thereon, and a connection to the transmission similar to that shown in FIG. 2. The transmission in this embodiment is comprised of a bantam duty hydrostatic transmission 35 such as a Hydro-Gear BDU-10, coupled to gear box 36. In this embodiment, gear box 36 is comprised of two casing halves 38A and 38B, joined together along a vertical split line 41 that is perpendicular to the longitudinal axes of axles 37 and 15. A pair of rear axles 37 are driven by gear box 36 and extend from the respective casing halves 38A and 38B to drive wheels 13. In this embodiment, pump input shaft 31 is directly engaged to hydraulic pump 33.

Pump 33 and motor 43 are mounted inside the casing of HST 35, which is secured to gear box 36, and are connected through porting 42 or another hydraulic connection means. Motor shaft 45 is directly coupled to motor 43 and extends out of HST 35 into gear box 36, where it engages gear train 46, which comprises a plurality of gears 46A to 46F and various transfer shafts 44A and 44B. Axles 37 are driven by gear train 46 through differential 47. A charge pump or auxiliary pump 34 may optionally be used to increase the hydraulic pressure in the system or to provide hydraulic fluid for power steering, raising bed 48, or other applications as needed; in this embodiment pump 34 is powered by pump input shaft 31.

Figure 6:
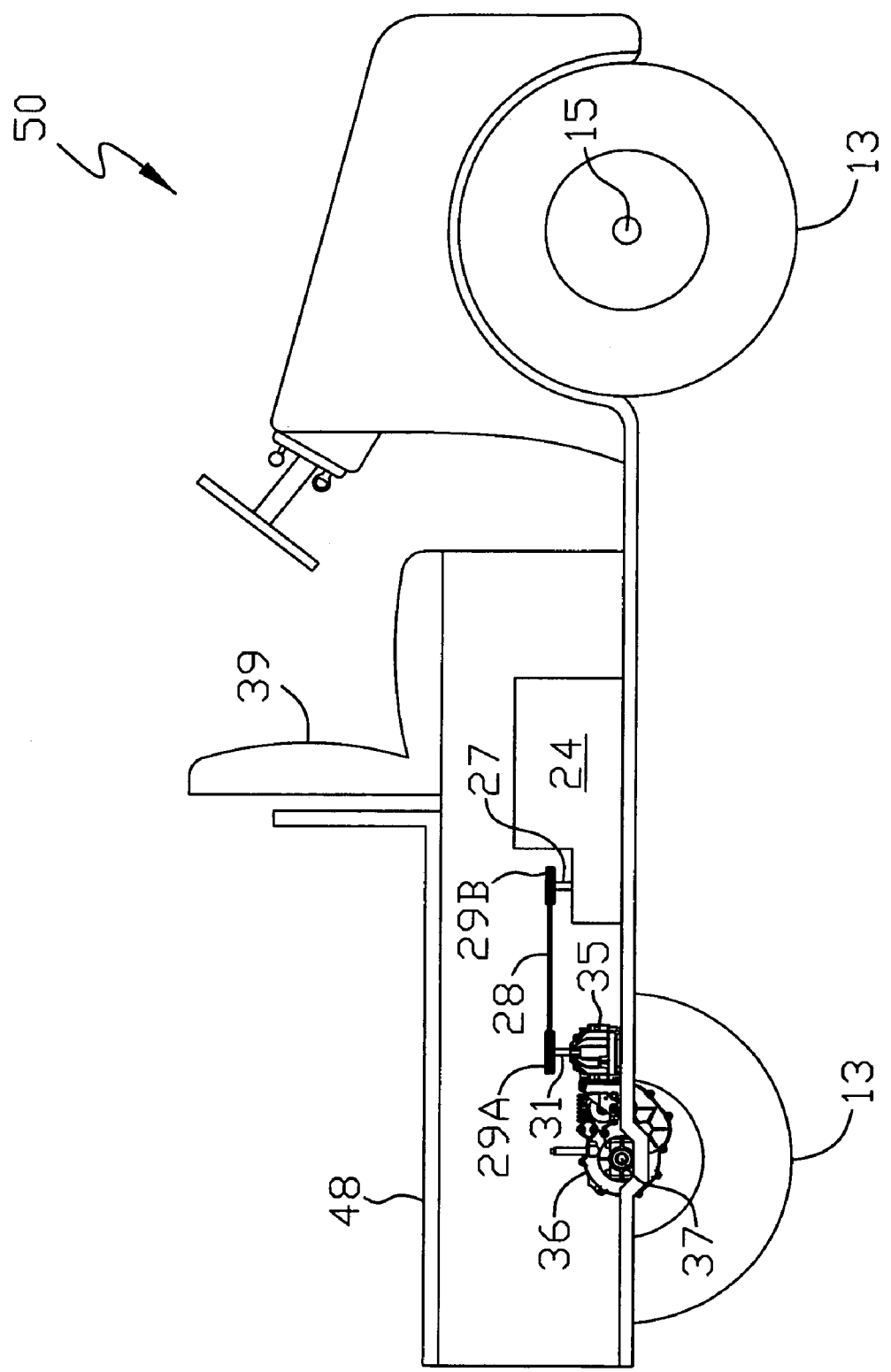
FIG. 6 is a side, partially-schematic view of a vehicle in accordance with a further embodiment of this invention.
Figure 7:
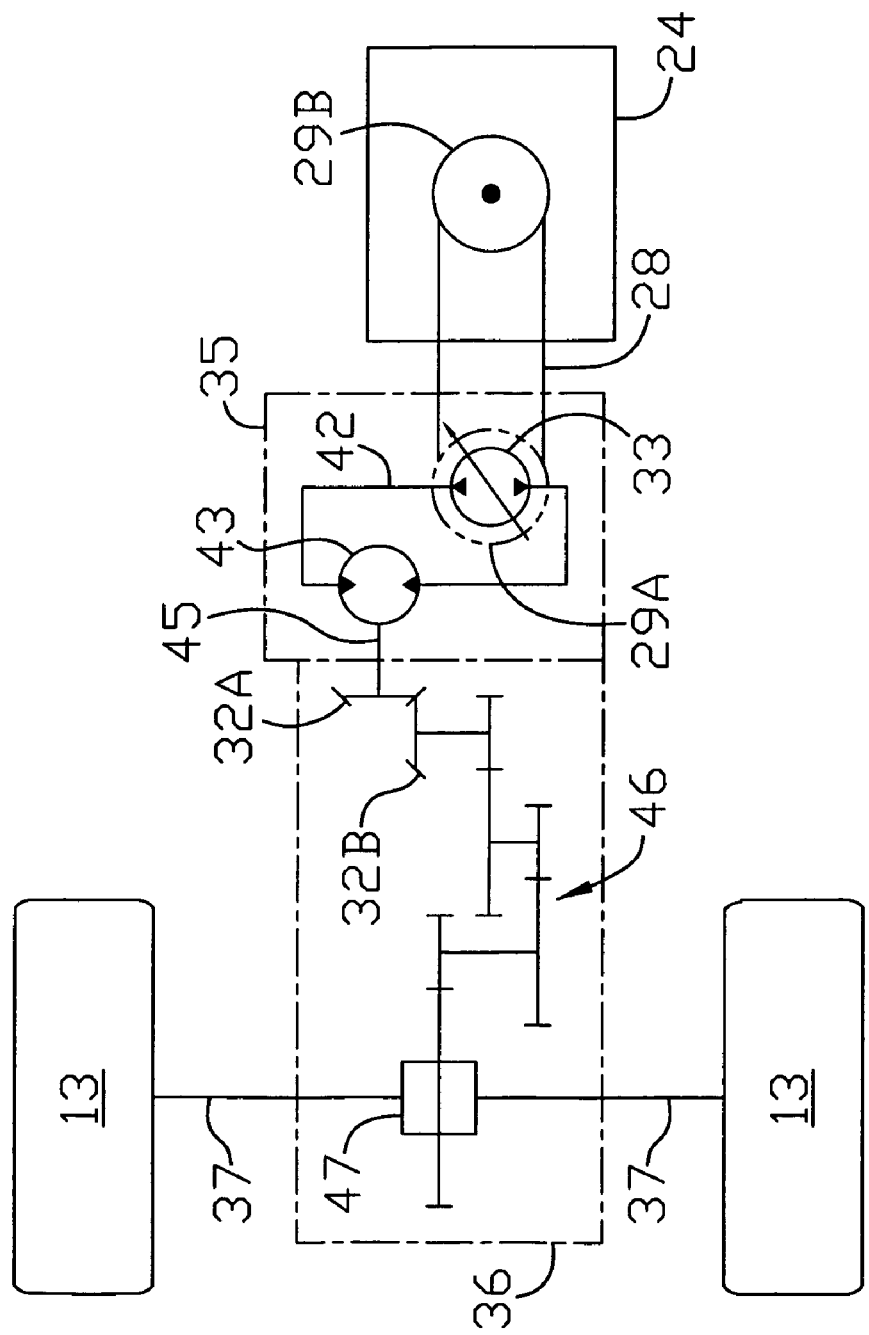
FIG. 7 is a schematic plan view of the transmission and other drive components of the vehicle shown in FIG. 6.

In the embodiment depicted in FIGS. 6 and 7 pump input shaft 31 extends upwards from HST 35 and parallel to engine drive shaft 27. Pulleys 29A and 29B and belt 28 connect drive shaft 27 to input shaft 31. As in the embodiment described above, a pump 33 is engaged to motor 43 through porting 42, and motor shaft 45 extends out of HST 35 and into gear box 36, where it drives a gear train 46. The key distinction in the gear train arrangement disclosed in this embodiment is the use of bevel gears 32A and 32B to create a 90° turn of the rotational force from motor shaft 45. This arrangement gives the user flexibility in deciding how to mount HST 35 with respect to gear box 36.

Figure 8:
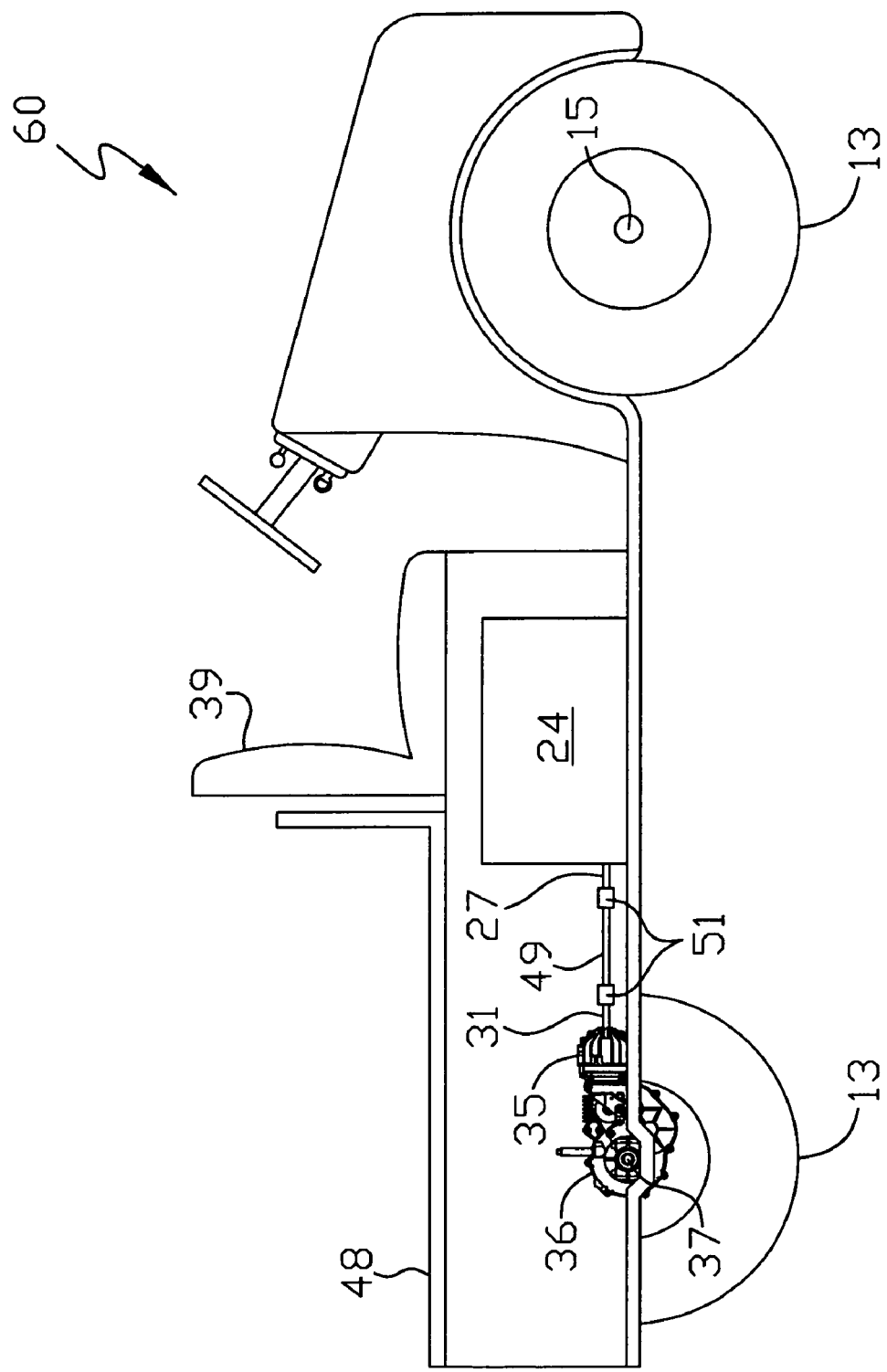
FIG. 8 is a side, partially-schematic view of a vehicle in accordance with another embodiment of this invention.
Figure 9:
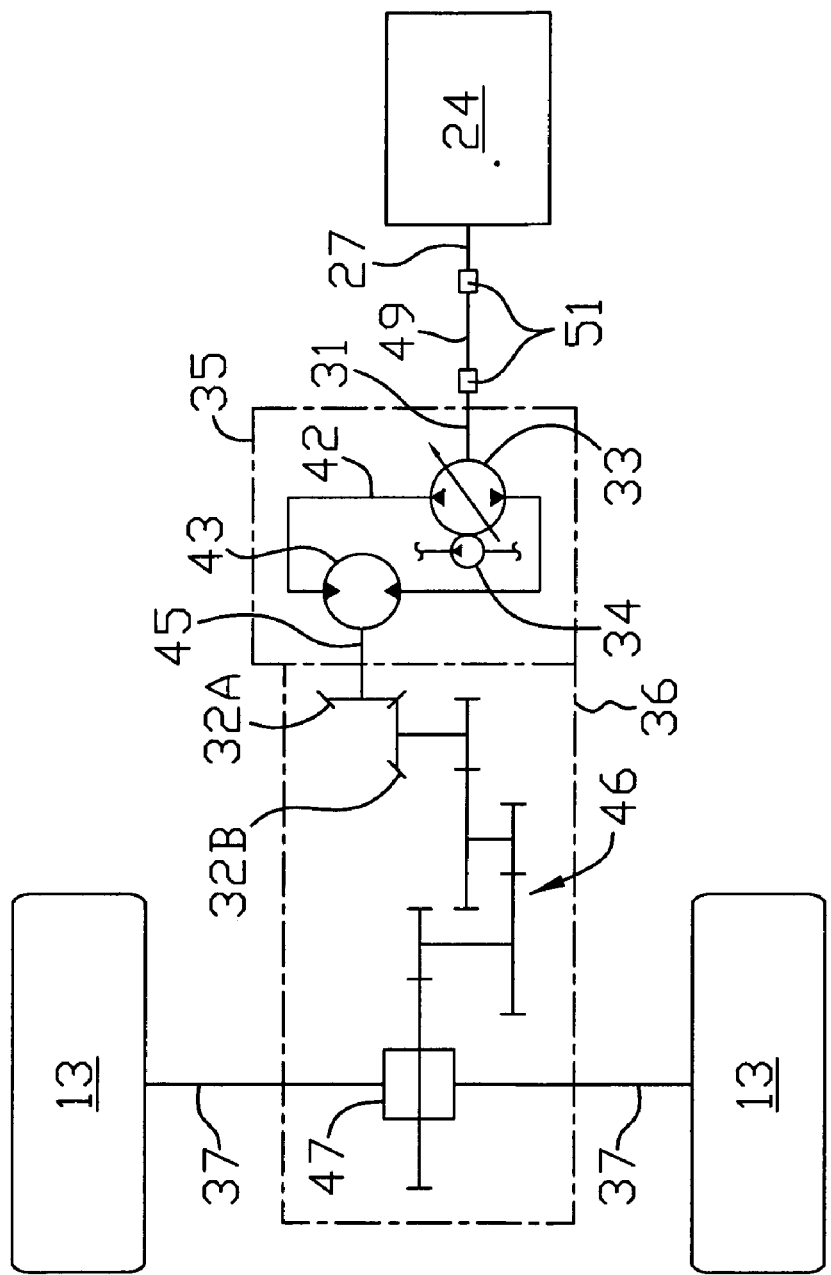
FIG. 9 is a schematic plan view of the transmission and other drive components of the vehicle shown in FIG. 8.

FIG. 8 depicts a similar vehicle 60, where the key difference from that shown in FIG. 6 is the use of connecting shaft 49 and couplers 51 to transfer rotational power from engine drive shaft 27 to HST input shaft 31, and input shaft 31 is mounted coaxially with drive shaft 27 and perpendicular to axles 37. Note that connecting shaft 49 is optional and drive shaft 27 may be connected to input shaft 31 by means of a coupler 51, which may be a universal joint coupler for flexibility. Motor shaft 45 is mounted perpendicular to axles 37 and along the longitudinal axis of the vehicle, as shown most clearly in FIG. 9. Motor shaft 45 is engaged to gear train 46 through bevel gears 32A and 32B. Charge or auxiliary pump 34 is again optionally used and may be driven by input shaft 31.

Figure 10:
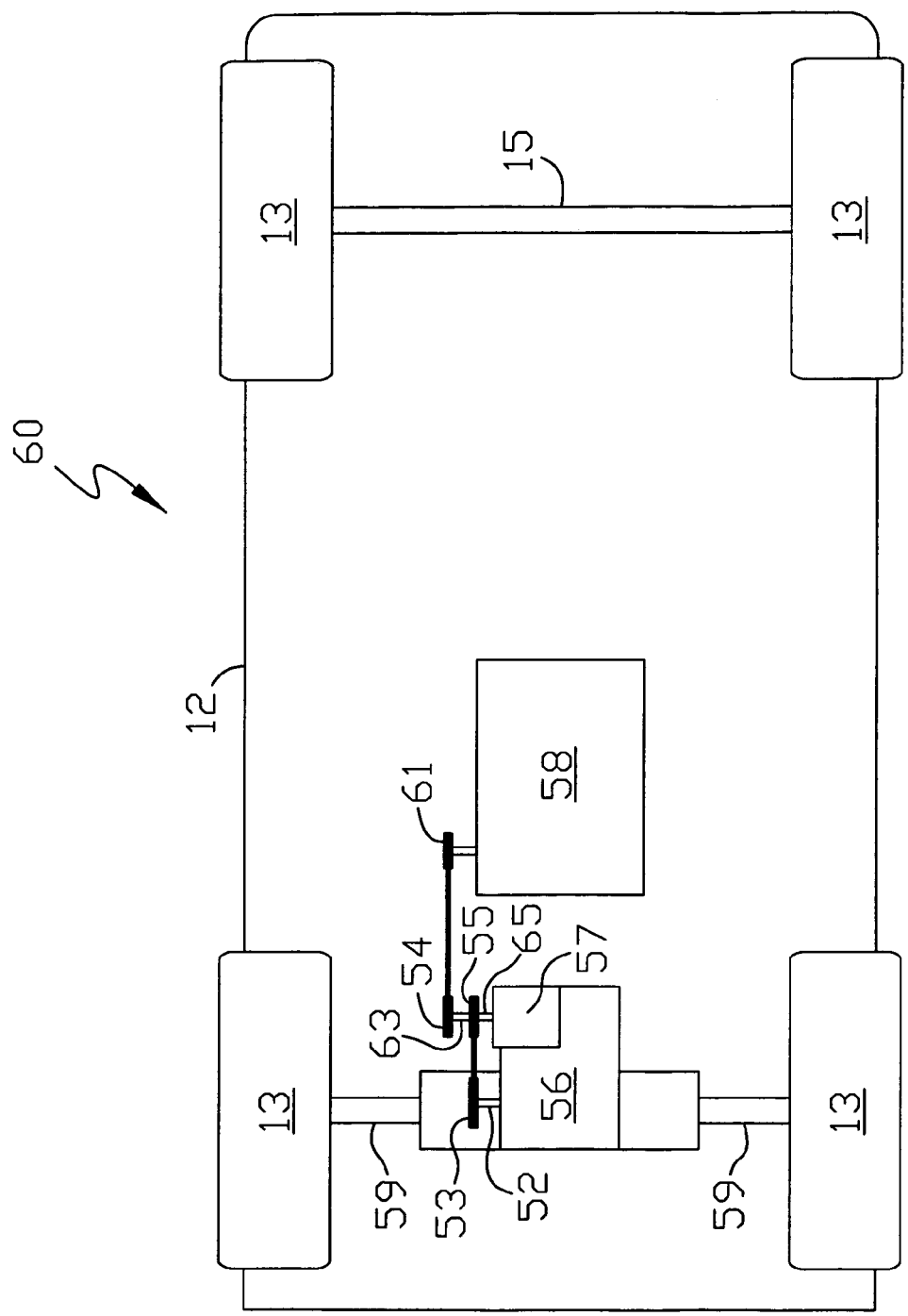
FIG. 10 is a bottom schematic plan view of a further embodiment of this invention.
Figure 11:
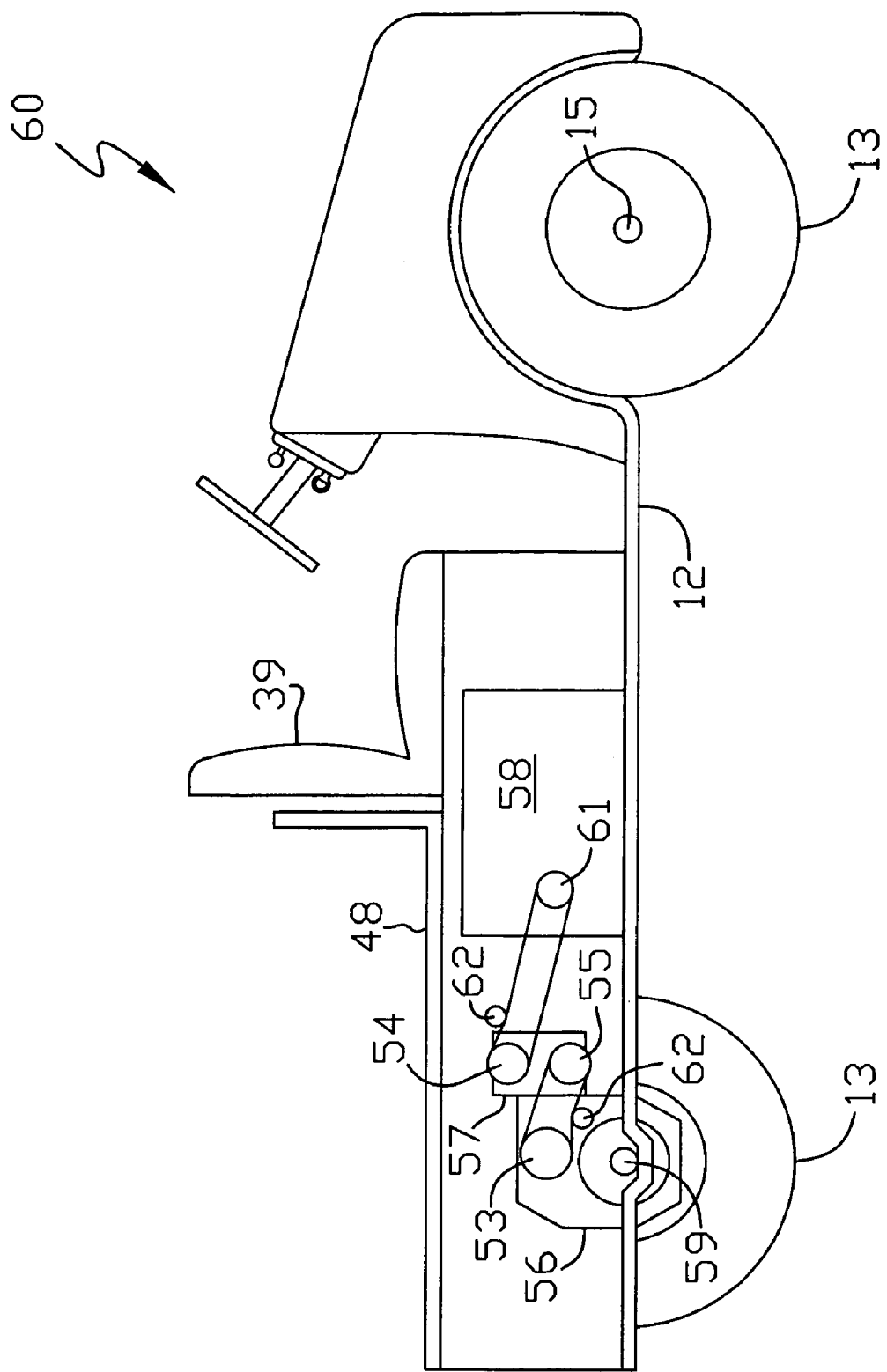
FIG. 11 is a side schematic view of the vehicle shown in FIG. 10.

FIGS. 10 and 11 depict a similar utility vehicle 60, where engine 58 is connected to HST 57 through pulleys 61 and 54 in a manner similar to that described above. Pump input shaft 63 is driven by pulley 54 and drives the hydraulic pump, which is not shown in this embodiment. The hydraulic motor output shaft 65 drives pulley 55, and the rotational output of HST 57 is transferred through pulley 55 to pulley 53 and then to gear box input shaft 52 to drive gear box 56, which in turn is engaged to and drives output axles 59. As shown most clearly in FIG. 11, idler pulleys 62 may be used to maintain belt wrap and tension. Pump input shaft 63 and motor output shaft 65 may be located in a plane which is parallel to, e.g., the longitudinal axis of rear axle 59, and pump input shaft 63 is located above motor output shaft 65 with respect to the ground.

Figure 12:
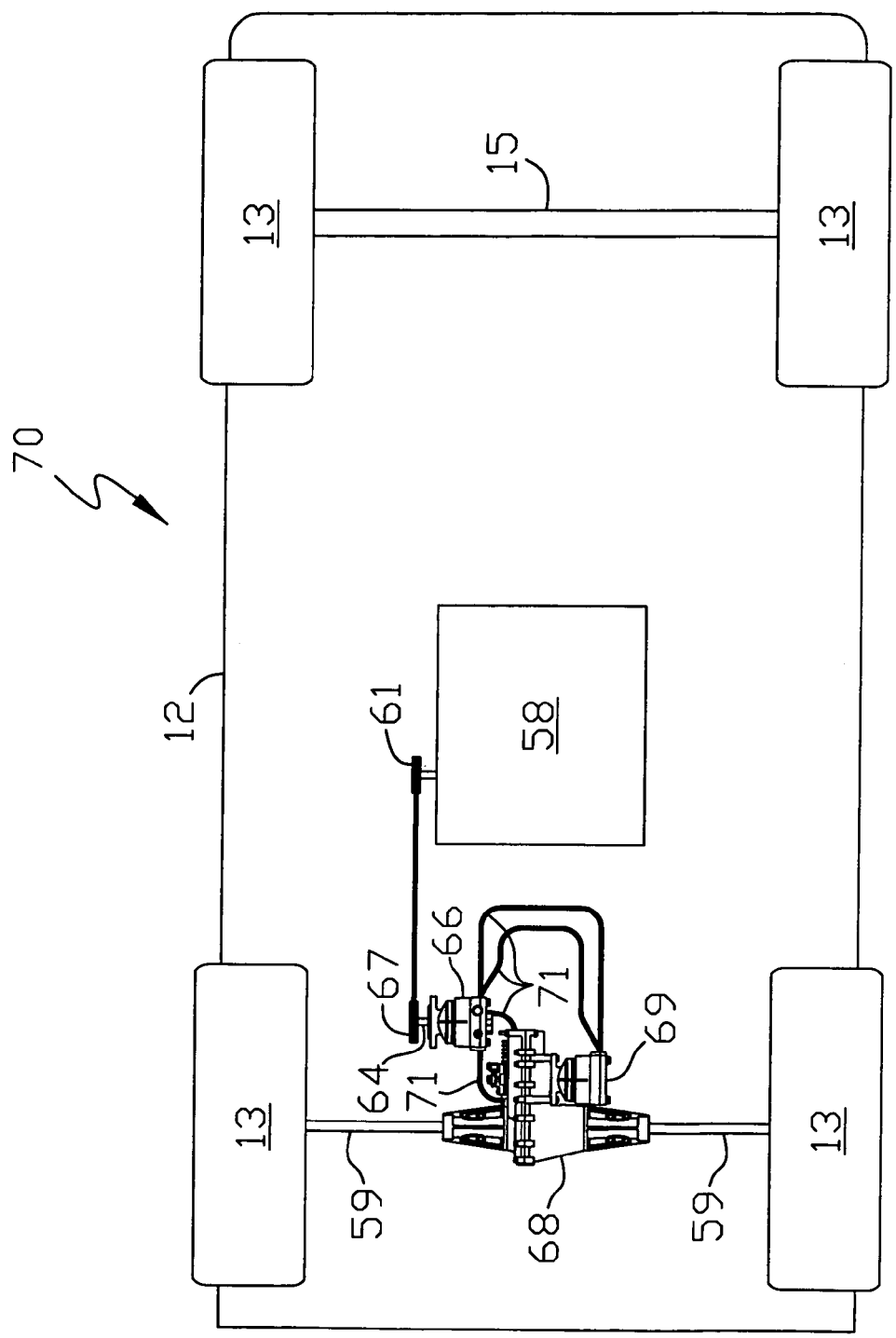
FIG. 12 is a bottom, partially-schematic plan view of a vehicle incorporating a further embodiment of this invention.

FIG. 12 shows an alternative embodiment of vehicle 70, where engine 58 is connected to hydraulic pump 66 through pulleys 61 and 67 in a manner similar to that described above. In order to increase the flexibility, this embodiment does not use a unitary HST such as is shown in, e.g., FIGS. 3, 4, 6 and 8 above, but rather uses a separate hydraulic pump 66 and hydraulic motor 69 connected through high pressure hoses 71. Motor 69 is then mounted on gear box 68.

Figure 13:
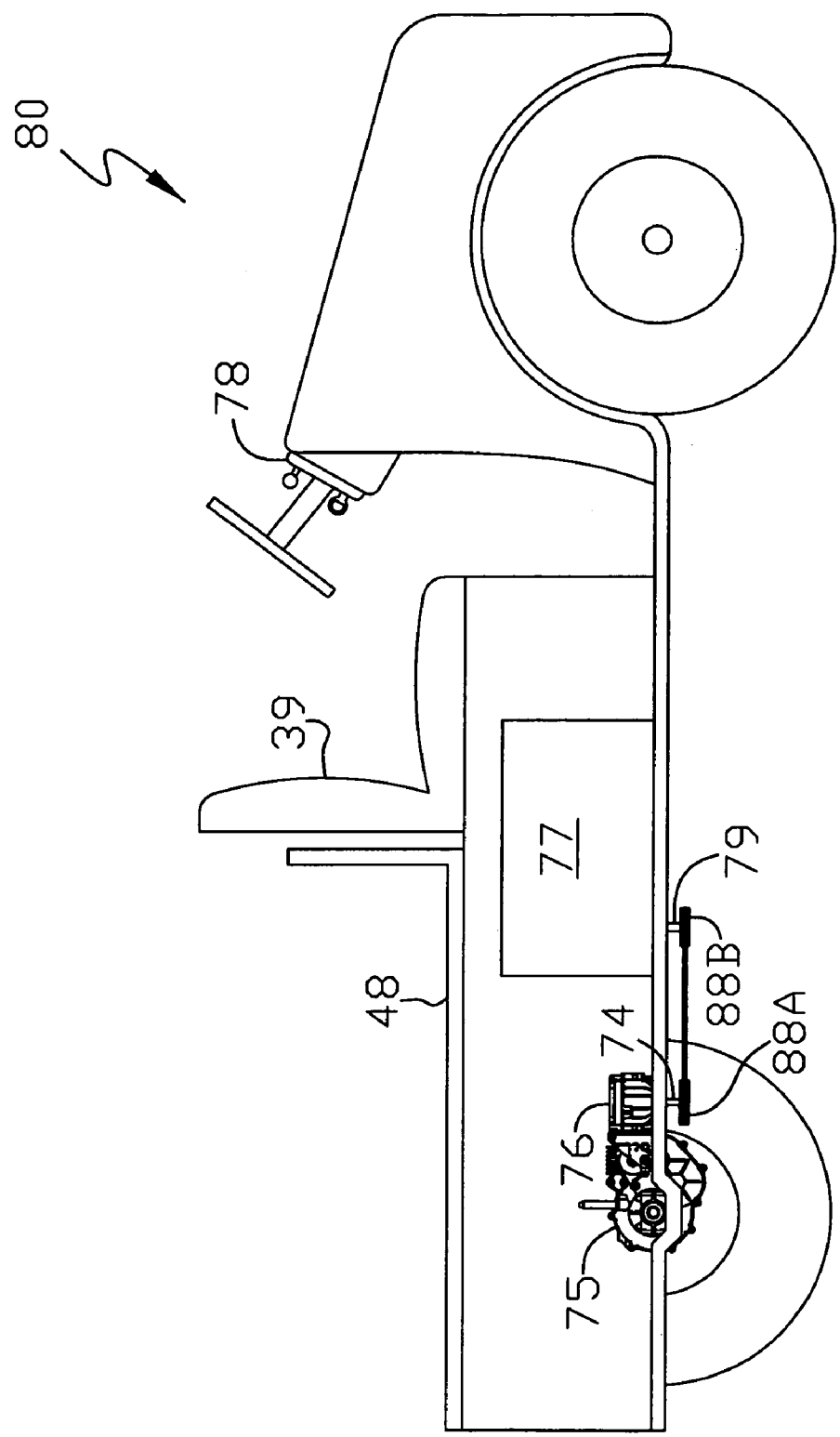
FIG. 13 is a side, partially-schematic view of a vehicle incorporating a further embodiment of this invention.

FIG. 13 depicts another embodiment where engine 77 has an output shaft 79 extending downwardly therefrom, and perpendicular to the longitudinal axis of the vehicle 80. HST 76 is mounted to gear box 75 in such a manner that input shaft 74 also extends downwardly therefrom and parallel to engine shaft 79, so that the two shafts can be connected though pulleys 88A and 88B. This embodiment affords additional flexibility in the mounting of the primary components of the vehicle.

Figure 14:
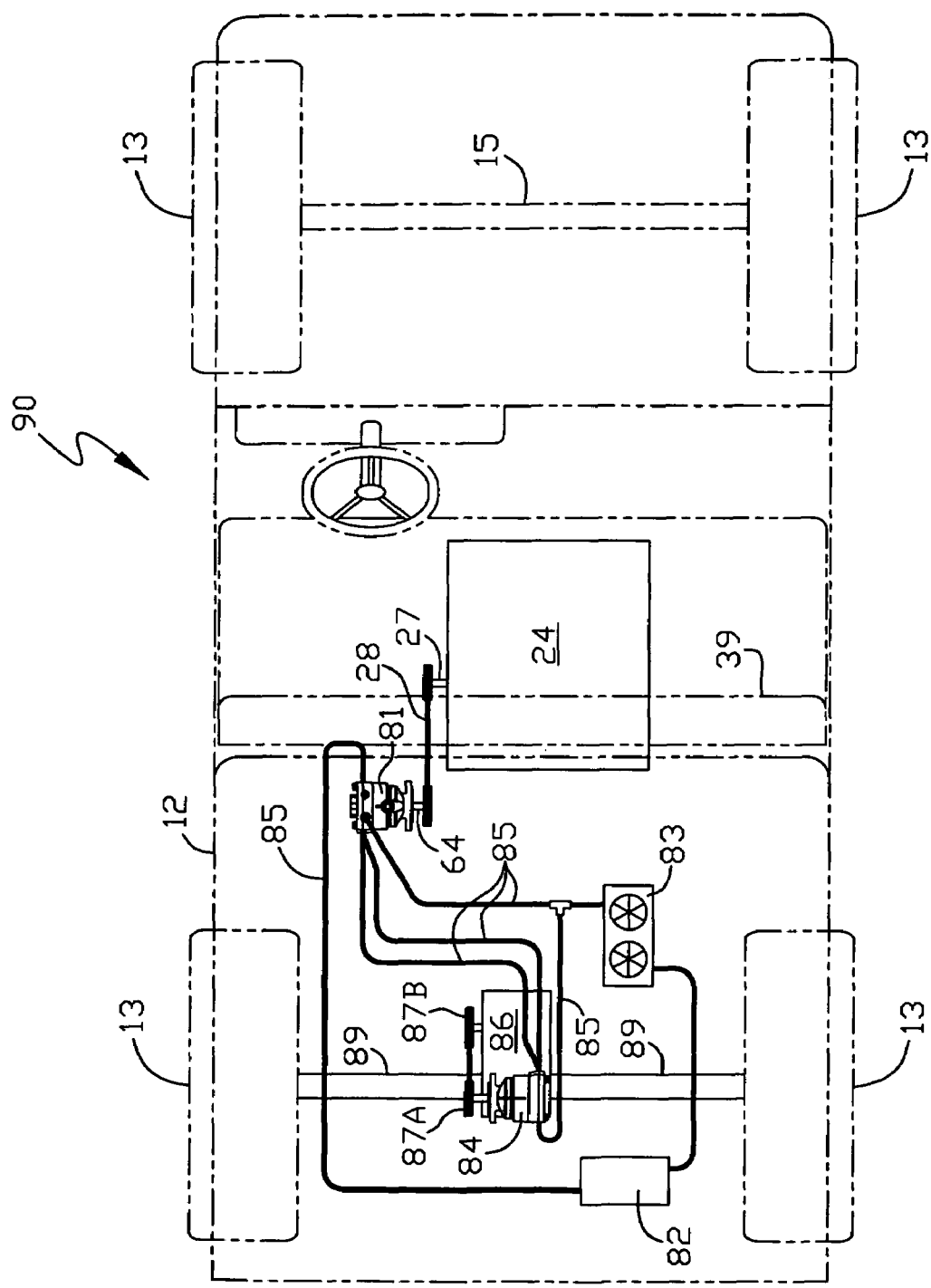
FIG. 14 is a bottom, partially-schematic plan view of a vehicle incorporating another embodiment of this invention.

FIG. 14 shows another embodiment showing vehicle 90, where separate pump 81 and motor 84 are connected via hoses 85. Pump 81 is mounted so that pump input shaft 64 is parallel to engine output shaft 27 of engine 24, and both are parallel to axles 15 and 89. A separate reservoir 82 and optional oil cooler 83 are also connected to this hydraulic circuit through hoses 85. Motor 84 is secured to gear box 86 through pulleys 87A and 87B. While all the hoses in this figure are all identified as hose 85, it will be appreciated by those of ordinary skill in the art that the specifications of each hose will be dependent on where they are used. For example, the hoses between the pump 81 and motor 84 will be capable of carrying high pressure hydraulic fluid, and the hose from the oil cooler 83 to the pump 81 will carry oil that may be at less than atmospheric pressure.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A utility vehicle comprising:
   a front axle;
   a pair of rear axle shafts;
   a seat for at least two occupants positioned between the front axle and the rear axle shafts;
   a load bed positioned over the rear axle shafts;
   a prime mover located between the front axle and the rear axle shafts and at least partially positioned below the seat, the prime mover having a prime mover output shaft that extends from the prime mover generally perpendicular to the longitudinal direction of the vehicle and a pulley attached to the end of the prime mover output shaft; and
   a hydraulic drive system drivingly coupled to the rear axle shafts and driven by the prime mover by a belt and pulley system, wherein the hydraulic drive system comprises:
      a hydraulic pump driven by a pump input shaft, the pump input shaft comprising a pulley;
      a hydraulic motor located within a common housing with the hydraulic pump, and hydraulically connected to the hydraulic pump and driving a motor output shaft; and gears and a differential located in the common housing with the hydraulic pump and the hydraulic motor;

wherein the prime mover output shaft and the pump input shaft are parallel to the front axle and the rear axle shafts.

2. A vehicle comprising:

a front axle;

a hydraulic drive system, comprising:
- a hydraulic pump driven by a pump input shaft with a pump input pulley;
- a hydraulic motor hydraulically driven by the hydraulic pump and driving a motor output shaft;
- a plurality of gears driven by the motor output shaft;
- a differential driven by the plurality of gears; and
- a pair of rear axle shafts driven by the differential;

a generally unenclosed seat for side-by-side seating of at least two occupants positioned between the front axle and the rear axle shafts;

a prime mover located between the front axle and the rear axle shafts and at least partially positioned below the seat and having a prime mover output shaft with a prime mover output pulley attached to the end of the prime mover output shaft;

a load bed extending from the seat toward the rear axle shafts;

a belt coupling the pump input pulley with the prime mover output pulley; and wherein the front axle, the rear axle shafts, the pump input shaft and the motor output shaft are generally parallel.

3. A vehicle comprising:

a front axle;

a pair of rear axle shafts;

a generally unenclosed seat with side-by-side seating for at least two occupants, the generally unenclosed seat positioned between the front axle and the rear axle shafts;

a prime mover positioned generally at the center of the vehicle, the prime mover having a prime mover output shaft;

a bed extending from an area over the prime mover to the rear axle shafts;

a hydraulic drive system having a pump input shaft and a motor output shaft, the hydraulic drive system drivingly coupled to the rear axle shafts and driven by the prime mover through a belt, wherein the belt couples the prime mover output shaft with the input shaft; and wherein the prime mover output shaft, pump input shaft, the front axle and the rear axle shafts are parallel.

4. A utility vehicle comprising:

a front axle;

a pair of rear axle shafts;

a seat for at least two occupants positioned between the front axle and the rear axle shafts;

a load bed positioned over the rear axle shafts;

a prime mover located between the front axle and the rear axle shafts and at least partially positioned below the seat, the prime mover having a prime mover output shaft that extends from the prime mover generally perpendicular to the longitudinal direction of the vehicle and a pulley attached to the end of the prime mover output shaft; and a hydraulic drive system drivingly coupled to the rear axle shafts and driven by the prime mover by a belt and pulley system, wherein the hydraulic drive system comprises:
- a hydraulic pump driven by a pump input shaft, the pump input shaft comprising a pulley; and
- a hydraulic motor located within a common housing with the hydraulic pump, and hydraulically connected to the hydraulic pump and driving a motor output shaft, wherein the motor output shaft is perpendicular to the pump input shaft.

5. The utility vehicle of claim 4, the hydraulic drive system further comprises gears and a differential located in the common housing with the hydraulic pump and the hydraulic motor.

6. The utility vehicle of claim 4, wherein the prime mover output shaft extends from the prime mover away from the vehicle.

7. The utility vehicle of claim 4, wherein the prime mover output shaft extends from the prime mover toward the vehicle.

8. The utility vehicle of claim 4, wherein the hydraulic pump input shaft extends from the hydraulic pump away from the vehicle.

9. The utility vehicle of claim 4, wherein the hydraulic pump input shaft extends from the hydraulic pump toward the vehicle.

10. The utility vehicle of claim 4, wherein the common housing may be positioned in at least two orientations with respect to a gear box containing gears driven by the hydraulic motor.

11. A vehicle comprising:

a front axle;

a hydraulic drive system comprising a hydraulic pump driven by a pump input shaft with a pump input pulley, a hydraulic motor hydraulically driven by the hydraulic pump and driving a motor output shaft, a plurality of gears driven by the motor output shaft, a differential driven by the plurality of gears, and a pair of rear axle shafts driven by the differential;

a generally unenclosed seat for side-by-side seating of at least two occupants positioned between the front axle and the rear axle shafts;

a prime mover located between the front axle and the rear axle shafts and at least partially positioned below the seat and having a prime mover output shaft with a prime mover output pulley attached to the end of the prime mover output shaft;

a load bed extending from the seat toward the rear axle shafts; and a belt coupling the pump input pulley with the prime mover output pulley;

wherein the motor output shaft is generally perpendicular to the prime mover output shaft, the pump input shaft, the front axle and the rear axle shafts.

12. The vehicle of claim 11, wherein the hydraulic pump and the hydraulic motor are located within a first housing attached to a second housing containing the plurality of gears and the differential.

13. The vehicle of claim 11, wherein the hydraulic drive system is an integrated hydrostatic transaxle.

14. A vehicle comprising:

a front axle;

a pair of rear axle shafts;

a generally unenclosed seat with side-by-side seating for at least two occupants, the generally unenclosed seat positioned between the front axle and the rear axle shafts;

a prime mover positioned generally at the center of the vehicle, the prime mover having a prime mover output shaft;

a bed extending from an area over the prime mover to the rear axle shafts; and a hydraulic drive system having a pump input shaft and a motor output shaft, the hydraulic drive system drivingly coupled to the rear axle shafts and driven by the prime mover through a belt;

wherein the motor output shaft is perpendicular to the front axle, the rear axle shafts, the pump input shaft and the prime mover output shafts.

15. The vehicle of claim 14, wherein the hydraulic drive system comprises a housing containing a hydraulic pump driven by the pump input shaft, and a hydraulic motor, hydraulically connected to the hydraulic pump and driving the motor output shaft.

16. The vehicle of claim 15, wherein the housing further contains a plurality of gears driven by the motor output shaft.

17. The vehicle of claim 16, wherein the housing further contains a differential driven by the plurality of gears and drivingly engaged to the rear axle shafts.

* * * * *